(12) United States Patent
Nakamura et al.

(10) Patent No.: US 6,313,213 B1
(45) Date of Patent: Nov. 6, 2001

(54) RUBBER COMPOSITION FOR TIRE TREAD

(75) Inventors: Toru Nakamura; Yasushi Kikuchi; Tetsuji Kawazura, all of Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/522,017

(22) Filed: Mar. 9, 2000

(30) Foreign Application Priority Data

Mar. 11, 1999 (JP) .................................................. 11-064778

(51) Int. Cl.$^7$ ....................................................... C08K 3/04
(52) U.S. Cl. ........................... 524/495; 524/424; 524/505; 524/526
(58) Field of Search .................................. 524/424, 495, 524/505, 526

(56) References Cited

U.S. PATENT DOCUMENTS 5,679,744  10/1997  Kawauzra et al. .
5,985,978  * 11/1999  Kikuchi et al. ....................... 524/495

FOREIGN PATENT DOCUMENTS 64-90232    4/1989   (JP) .

OTHER PUBLICATIONS

"Natural Rubber and Butadiene Rubber Blend Using Diblock Copolymer of Isoprene–Butadiene as Compatibilizer", Journal of Applied Polymer Science, vol. 49, 807–814 (1993).

IBR Block Copolymers as Compatibilizers in NR/BR Blends, Rubber Chemistry and Technology, vol. 66, 538–549 (1993).

* cited by examiner

Primary Examiner—Kriellion A. Sanders
(74) Attorney, Agent, or Firm—Arent Fox Kintner Plotkin & Kahn, PLLC.

(57) ABSTRACT

A rubber composition for a tire tread comprising (1) (i) 60 to 90 parts by weight of natural rubber and/or polyisoprene rubber, (ii) 10 to 35 parts by weight of a high cis polybutadiene rubber having a melt viscosity of 90 to 150 cps and a cis content of 90% by weight or more, and (iii) 0.5 to 5 parts by weight of an A-B type block copolymer composed of (A) a poly(styrene-butadiene) or polybutadiene block having a styrene content (St) of 0 to 35% by weight and a butadiene content (Bd) of 65 to 100% by weight, having a 1,2-vinyl bond content (Vn) of 5 to 80 mol %, and satisfying the relationship of $Vn \leq 2St+30$ and (B) a polyisoprene block having a cis content of at least 70% by weight, in a ratio by weight (A)/(B) of 20 to 80/80 to 20, and (2) 40 to 60 parts by weight of carbon black having an $N_2SA$ of 125 m$^2$/g or more.

5 Claims, No Drawings

RUBBER COMPOSITION FOR TIRE TREAD

BACKGROUND OF THE INVENTION

1. Field of the Invention

The present invention relates to a rubber composition for a tire tread. More specifically, it relates to a rubber composition for a tire tread obtained by blending an A-B type block copolymer composed of (A) a poly(styrene-butadiene) block or a polybutadiene block, and (B) a polyisoprene block, as a compatibilizing agent, into a rubber composed of natural rubber (NR) and/or polyisoprene rubber (IR) and a high cis and high linearity polybutadiene rubber (BR) so as to improve the abrasion resistance and chipping resistance thereof, without impairing the processability thereof.

2. Description of the Related Art

In the cap treads of large sized tires for trucks, buses, etc., it has been known in the past to blend in butadiene so as to improve the abrasion resistance. Further, for the butadiene rubber, it has been known that blending of butadiene rubber having a large cis component or butadiene rubber having a large linearity (or melt viscosity) has a large effect in the improvement of the abrasion resistance. However, if a plurality of polymers are blended and used as tire tread rubber compositions, etc., a problem of phase separated interfaces arises when the polymers are incompatible to each other. In most cases, this has a detrimental effect on the tensile strength, tear strength, abrasion resistance, etc. With respect to the problem of decrease in the breaking characteristics due to the above-mentioned incompatibility of the polymer blend, the incorporation of a small amount of a block copolymer composed of polybutadiene and polyisoprene into a blend of natural rubber/polybutadiene rubber is described in *J. Apply. Polym. Sci.*, 49 (1983) and *RCT.* 66 (1993). However, these references only consider the above specific block copolymers in a limited fashion and do not describe any common studies or opinions as to the industrially important polymers containing SBR blocks having a large degree of freedom.

The present inventors previously provided a rubber composition for a tire tread having improved abrasion resistance, heat buildup, and wet grip by blending a high cis polybutadiene rubber and medium vinyl polybutadiene rubber into natural rubber and/or polyisoprene (Japanese Unexamined Patent Publication (Kokai) No. 1-90232) and also provided a rubber composition having improved breaking characteristics by incorporating not more than 20 parts by weight of a specific A-B block copolymer, as a compatibilizing agent, into a blend of natural rubber and/or polyisoprene and high cis polybutadiene rubber (Japanese Unexamined Patent Publication (Kokai) No. 8-193145). However, even in these rubber compositions for treads, there are still problems in the processability at the time of mixing such as kneading performance of mixing and the chipping resistance was not satisfactory either.

SUMMARY OF THE INVENTION

Accordingly, the objects of the present invention are to eliminate the above-mentioned problems in the prior art and to provide a rubber composition for a tire tread having improved processability, and also improved abrasion resistance and chipping resistance.

In accordance with the present invention, there is provided a rubber composition for a tire tread comprising:

(1) (i) 60 to 90 parts by weight of at least one rubber selected from the group consisting of natural rubber and polyisoprene rubber, (ii) 10 to 35 parts by weight of a high cis polybutadiene rubber having a melt viscosity of 90 to 150 cps and a cis content of at least 90% by weight, and (iii) 0.5 to 5 parts by weight of an A-B type block copolymer composed of (A) a poly (styrene-butadiene) block or polybutadiene block having a styrene content (St) of 0 to 35% by weight and a butadiene content (Bd) of 65 to 100% by weight, having a 1,2-vinyl bond content (Vn) of 5 to 80 mol %, and satisfying the relationship of $Vn \leq 2St+30$ and (B) a polyisoprene block having a cis content of at least 70% by weight, in a ratio by weight (A)/(B) of 20 to 80/80 to 20, and (2) 40 to 60 parts by weight, based upon 100 parts by weight of the total rubber component, of carbon black having a nitrogen specific surface area ($N_2SA$) of at least 125 $m^2/g$.

DESCRIPTION OF THE PREFERRED EMBODIMENTS

According to the present invention, 10 to 35 parts by weight of the above specific polybutadiene (BR) is blended into natural rubber (NR) and/or polyisoprene rubber (IR) so as to intend to improve the abrasion resistance and a high cis high linearity polybutadiene (BR) is selected and blended to further improve the abrasion resistance and improve the extrudability. Further, 0.5 to 5.0 parts by weight of the above specific A-B block copolymer is blended to improve the mixability (or kneading performance) by fine dispersion of the above specific polybutadiene (BR) phase and improve the chipping resistance.

The NR, IR, and high cis high linearity BR used in the rubber composition according to the present invention have to be blended in amounts suited for use for the rubber composition for a tire tread of the present invention. The NR and/or IR can be blended in an amount of 60 to 90 parts by weight, preferably 70 to 80 parts by weight, based upon the total weight of the rubber content, and the ratio of NR/IR can be made to 100/0 to 50/50 and the high cis high linearity BR can be blended in an amount of 10 to 35 parts by weight, preferably 15 to 30 parts by weight, based upon the total weight of the rubber content. Note that the melt viscosity of the high cis high linearity BR used in the present invention is at least 90 cps, preferably 105 to 125 cps, and the cis content is 90 to 100% by weight, preferably 95 to 100% by weight. If the melt viscosity is less than 90 cps, the abrasion resistance and the extrudability are decreased, and therefore, this is not preferred. Further, if the cis content is less than 90% by weight, the desired abrasion resistance is not obtained, and therefore, this is also not preferred.

Next, according to the present invention, when a predetermined amount of a specific A-B type block copolymer is incorporated into the above-mentioned blend, it is possible to achieve the object of improvements in the mixability (or kneading performance) and chipping resistance. If the amount of the A-B type block copolymer is too small, the desired effect of improvement cannot be obtained, while conversely if too large, the viscoelastic properties of the block copolymer per se are manifested, and therefore, the viscoelastic properties such as the abrasion resistance, extrudability, naturally expected from an NR and/or IR/high cis high linearity BR blend are lost, and therefore, this is not preferred. From this viewpoint, the A-B type block copolymer used in the present invention comprises 0.5 to 5 parts by weight, preferably 1 to 3 parts by weight, more preferably 1 to 2.5 parts by weight, of the A-B type block copolymer, based upon 100 parts by weight of the total polymer component including A-B type block copolymer.

The A-B type block copolymer used in the present invention is composed of (A) a styrene (St) and butadiene (Bd) copolymer block or a polybutadiene (Bd) polymer and (B) a polyisoprene block. The styrene content (St), 1,2-vinyl bond content (Vn), and cis isoprene content of the block components (A) and (B) and the weight ratio (A)/(B) of the (A) component and (B) component are as follows:

Block (A)

Poly(styrene-butadiene) or polybutadiene having a styrene content of 0 to 35% by weight, preferably 1 to 35% by weight, more preferably 5 to 30% by weight, and the balance of butadiene content, a 1,2-vinyl bond content (Vn) of the butadiene portion of 5 to 80 mol %, preferably 10 to 70 mol %, and $Vn \leq 2St+30$, wherein St is a styrene content.

Block (B)

Polyisoprene having a cis content of at least 70% by weight, preferably at least 75% by weight (A)/(B)=20 to 80/80 to 20 (parts by weight), preferably 30 to 70/70 to 30 (parts by weight)

If the styrene content of the block component (A) is too large, the component becomes incompatible with the high cis and high linearity BR, and, as a result, the desired effect is no longer obtained. Even if the content of the 1,2-vinyl bond is outside the above range, the compatibility with the high cis and high linearity BR becomes poor, and therefore, the desired effect cannot be obtained. If the cis content of the block component (B) is less than 70% by weight, the compatibility with the NR and/or IR becomes poor, and therefore, the expected fine phase structure cannot be obtained and the desired effect is not achieved. Further, when the ratio (A)/(B) is outside the above range, either because the entanglement with the matrix rubber (e.g., NR, IR, BR) becomes smaller or because the co-cross-linkability is decreased, the desired effect is no longer obtained.

The A-B type block copolymer used in the present invention is a known polymer. In general, an organoalkali metal compound catalyst such as butyl lithium is used to polymerize, for example, styrene and butadiene or butadiene in an organic solvent such as hexane to produce the block (A) and isoprene is further added to the resultant block still in the end living state to produce the block (B). It is possible to suitably select the ratio of the amount of monomers blended, the addition of a vinylizing agent, the polymerization conditions, etc. as desired at that time to obtain the desired block copolymer. Further, A-B type block copolymers may be coupled with, for example, stannous tetrachloride, silicon tetrachloride, etc. Further, as another method, it is possible to produce the copolymer by producing the block (A) and block (B) according to an ordinary method, followed by coupling with a coupling agent such as stannous tetrachloride or silicon tetrachloride. Note that the A-B type block copolymer may be end-modified with, for example, a compound having a cyclic amine bond:

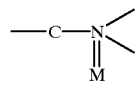

wherein M indicates an O atom or S atom.

Examples of such compounds are an amide compound, imide compound, lactum compound, or urea compound, or other modifying agents. The end-modified block can be produced by adding a suitable modifying agent in the living state after the copolymerization of the A-B type block copolymer is finished.

The molecular weight of the A-B type block copolymer used in the present invention is not particularly limited, but considering the entanglement or cross-linkability with the matrix rubber (NR, high cis and high linearity BR), the weight average molecular weight is preferably at least 30,000, more preferably 50,000 to 800,000.

The rubber composition for a tire tread of the present invention contains 40 to 60 parts by weight, preferably 42 to 58 parts by weight, based upon 100 parts by weight of the rubber component, of carbon black having a nitrogen specific surface area ($N_2SA$) of at least 125 $m^2/g$, preferably 125 to 165 $m^2/g$. If fine carbon black having an $N_2SA$ of at least 130 $m^2/g$ is used, it is possible to further improve the abrasion resistance and chipping resistance. Further, if necessary, it is possible to blend a suitable amount of silica, in addition to the carbon black, to the rubber composition of the present invention. If the carbon black having an $N_2SA$ of more than 165 $m^2/g$, the heat generation and the processability tend to be inferior and the cost is increased.

The rubber composition for a tire tread of the present invention may further contain various kinds of additives generally used for rubber compositions for automobile tires, in addition to the polymer component, carbon black, and silicate filler. Examples of such additives are sulfur, a vulcanization accelerator, an antioxidant, a filler, softening agent, a plasticizer, etc. The amounts of these additives to be blended may be made the general amounts.

EXAMPLES

The present invention will now be further explained by the following Examples, but, of course, the present invention is not limited in scope by these Examples.

Standard Example, Examples 1–7

Comparative Examples 1–11

The components used in the following formulations of the Standard Example, Examples, and Comparative Examples shown in Table 1 are as follows:

*1. NR: Natural rubber (RSS#3)

*2. BR-1: Nipol 1220 (made by Nippon Zeon), melt viscosity=56 cps, cis content=98 wt %

*3. BR-2: 150L (made by Ube Industry), melt viscosity=105 cps, cis content=98 wt %

*4. BR-3: 360L (made by Ube Industry), melt viscosity=124 cps, cis content=98 wt %

*5. AB type block copolymer
  A block: St/Vn=20 wt %/46 mol %
  B block: High cis IR (cis content if 80 wt %)
  A/B=70/30, molecular weight (Mw)=590,000

*6-A. Carbon black: Showblack N110 (made by Showa Cabot), $N_2SA=144$ $m^2/g$

*6-B. Carbon black: Showblack N339 (made by Showa Cabot), $N_2SA=88$ $m^2/g$

*6-C. Carbon black: Seast 3 (made by Tokai Carbon), $N_2SA=79$ $m^2/g$

*6-D. Carbon black: Trial product, $N_2SA=130$ $m^2/g$

*6-E. Carbon black: Seast 6 (made by Tokai carbon), $N_2SA=119$ $m^2/g$

*7. Zinc oxide: Zinc White No. 3 (made by Seido Chemical)

*8. Stearic acid: Lunac YA (made by Kao Soap)

*9. Antioxidant: Nocrac 6C (made by Ouchi Shinko Chemical)

*10. Wax: Sunnoc (made by Ouchi Shinko Chemical)
*11. Sulfur: Ground sulfur (made by Karuizawa Refinery)
*12. Vulcanization accelerator: Nocceler NS (made by Ouchi Shinko Chemical)

Manufacture of Test Tires and Test Methods Therefor

Rubber compositions obtained by mixing various rubber compositions according to the formulations shown in Table 1 by a Banbury mixer were used as the tread rubber for truck/bus tires having a tire size of 11R22.5 14 PR and test tires were manufactured according to ordinary vulcanization conditions.

Next, the following evaluations were conducted.

1) Mixingability: The kneading performance of the master batch at the time of extrusion from a Banbury mixer was visually evaluated. The performance was ranked by the following criteria in the evaluation:

++: Kneaded into a mass with almost no powder mixed in the rubber
+: Kneaded into a mass, but with scattered powder mixed in the rubber
±: Partially kneaded into a mass, but with free small pieces of rubber
−: Not kneaded into a mass with separate small pieces of rubber. Further, no powder mixed in rubber.

2) Extrudability: The number and size of the breaks (cracks) of the edges per unit length of the article extruded from an extruder were examined and classified into four stages for evaluation. The performance was ranked by the following criteria in the evaluation:

++: Excellent
+: Good
±: Fair
−: Poor

3) Abrasion resistance: The above test tires were mounted on a 10 ton truck, the depth of the grooves of the treads was measured after run for about 100,000 km by the normal load, and the distance of travel per 1 mm abrasion was calculated and expressed indexed to the value of the Standard Example as 100. The larger the value, the better the abrasion resistance exhibited.

4) Chipping resistance: The area of chipping per unit area of the surface of the tread after running the tires for about 100,000 km was examined and the results classified into four stages for evaluation. The performance was ranked by the following criteria in the evaluation:

++: Excellent
+: Good
±: Fair
−: Poor

The results are shown in Table 1.

TABLE 1

| | Stand. Ex. | Comp. Ex. 1 | Comp. Ex. 2 | Comp. Ex. 3 | Comp. Ex. 4 | Ex. 1 | Ex. 2 | Ex. 3 | Comp. Ex. 5 | Comp. Ex. 6 |
|---|---|---|---|---|---|---|---|---|---|---|
| NR*1 | 100 | 80 | 80 | 80 | 80 | 80 | 80 | 80 | 80 | 50 |
| BR-1*2 | — | 20 | 20 | — | — | | | | | |
| BR-2*3 | — | — | — | 20 | — | | | | | |
| BR-3*4 | — | — | — | — | 20 | 19 | 17.5 | 15 | 10 | 49 |
| A–B block copolymer*5 | — | — | — | — | — | 1 | 2.5 | 5 | 10 | 1 |
| Carbon black*6-A | 50 | 50 | 50 | 50 | 50 | 50 | 50 | 50 | 50 | 50 |
| Carbon black*6-B | — | — | — | — | — | — | — | — | — | — |
| Carbon black*6-C | — | — | — | — | — | — | — | — | — | — |
| Carbon black*6-D | — | — | — | — | — | — | — | — | — | — |
| Carbon black*6-E | — | — | — | — | — | — | — | — | — | — |
| Zinc white*7 | 3 | 3 | 3 | 3 | 3 | 3 | 3 | 3 | 3 | 3 |
| Stearic acid*8 | 2 | 2 | 2 | 2 | 2 | 2 | 2 | 2 | 2 | 2 |
| Antioxidant*9 | 2 | 2 | 2 | 2 | 2 | 2 | 2 | 2 | 2 | 2 |
| Wax*10 | 1 | 1 | 1 | 1 | 1 | 1 | 1 | 1 | 1 | 1 |
| Sulfur*11 | 1.5 | 1.5 | 1.5 | 1.5 | 1.5 | 1.5 | 1.5 | 1.5 | 1.5 | 1.5 |
| Vulcanization accelerator*12 | 1.0 | 1.0 | 1.0 | 1.0 | 1.0 | 1.0 | 1.0 | 1.0 | 1.0 | 1.0 |
| Mixingability | + | ± | + | − | − | + | + | ++ | ++ | − |
| Extrudability | + | − | − | + | ++ | ++ | ++ | ++ | ± | − |
| Abrasion resistance | 100 | 110 | 112 | 115 | 117 | 119 | 121 | 118 | 110 | 125 |
| Chipping resistance | + | ± | + | ± | + | + | ++ | ++ | ± | − |

| | Comp. Ex. 7 | Comp. Ex. 8 | Comp. Ex. 9 | Comp. Ex. 10 | Comp. Ex. 11 | Ex. 4 | Ex. 5 | Ex. 6 | Ex. 7 |
|---|---|---|---|---|---|---|---|---|---|
| NR*1 | 80 | 80 | 80 | 80 | 80 | 80 | 80 | 80 | 85 |
| BR-1*2 | — | — | — | — | — | — | — | — | — |
| BR-2*3 | 15 | 17.5 | 27.5 | 17.5 | 17.5 | 17.5 | 15 | 17.5 | 14.5 |
| A—B block copolymer*5 | 5 | 2.5 | 2.5 | 2.5 | 2.5 | 2.5 | 5 | 2.5 | 0.5 |
| Carbon black*6-A | — | — | 37 | — | — | 45 | — | — | 50 |
| Carbon black*6-B | 50 | — | — | 65 | — | — | — | — | — |
| Carbon black*6-C | — | 50 | — | — | — | — | — | — | — |
| Carbon black*6-D | — | — | — | — | — | — | 56 | 50 | — |
| Carbon black*6-E | — | — | — | — | 60 | — | — | — | — |
| Zinc white*7 | 3 | 3 | 3 | 3 | 3 | 3 | 3 | 3 | 3 |
| Stearic acid*8 | 2 | 2 | 2 | 2 | 2 | 2 | 2 | 2 | 2 |
| Antioxidant*9 | 2 | 2 | 2 | 2 | 2 | 2 | 2 | 2 | 2 |
| Wax*10 | 1 | 1 | 1 | 1 | 1 | 1 | 1 | 1 | 1 |

TABLE 1-continued

| | | | | | | | | | |
|---|---|---|---|---|---|---|---|---|---|
| Sulfur*11 | 1.5 | 1.5 | 1.5 | 1.5 | 1.5 | 1.5 | 1.5 | 1.5 | 1.5 |
| Vulcanization accelerator*12 | 1.0 | 1.0 | 1.0 | 1.0 | 1.0 | 1.0 | 1.0 | 1.0 | 1.0 |
| Mixingability | ++ | ++ | + | − | − | ++ | + | + | + |
| Extrudability | ++ | ++ | − | + | ± | + | + | ++ | ++ |
| Abrasion resistance | 93 | 87 | 89 | 116 | 120 | 107 | 122 | 108 | 113 |
| Chipping resistance | ± | ± | ± | − | ± | + | + | + | ++ |

As explained above, according to the present invention, it is possible to improve the mixingability and obtain a rubber composition for a tire tread superior in extrudability, abrasion resistance, and chipping resistance.

What is claimed is:

1. A rubber composition for a tire tread comprising:
(1) (i) 60 to 90 parts by weight of at least one rubber selected from the group consisting of natural rubber and polyisoprene rubber, (ii) 10 to 35 parts by weight of a high cis polybutadiene rubber having a melt viscosity of 90 to 150 cps and a cis content of at least 90% by weight, and (iii) 0.5 to 5 parts by weight of an A-B type block copolymer composed of (A) a poly (styrene-butadiene) or polybutadiene block having a styrene content (St) of 0 to 35% by weight and a butadiene content (Bd) of 65 to 100% by weight, having a 1,2-vinyl bond content (Vn) of 5 to 80 mol %, and satisfying the relationship of $Vn \leqq 2St+30$ and (B) a polyisoprene block having a cis content of at least 70% by weight, in a ratio by weight (A)/(B) of 20 to 80/80 to 20, and (2) 40 to 60 parts by weight, based upon 100 parts by weight of the total rubber component, of carbon black having a nitrogen specific surface area ($N_2SA$) of at least 125 $m^2/g$.

2. A rubber composition as claimed in claim 1, wherein the amount of the rubber component (i) is 70 to 80 parts by weight, based upon the total amount of the rubber component.

3. A rubber composition as claimed in claim 1, wherein the amount of the rubber component (ii) is 15 to 30 parts by weight, based upon the total amount of the rubber component.

4. A rubber composition as claimed in claim 1, wherein the amount of the carbon black is 42 to 58 parts by weight, based upon the total amount of the rubber component.

5. A rubber composition as claimed in claim 1, wherein $N_2SA$ of the carbon black is 130 to 165 $m^2/g$.

* * * * *